United States Patent [19]

Cotton et al.

[11] Patent Number: 4,740,954
[45] Date of Patent: Apr. 26, 1988

[54] MULTICAST ROUTING ALGORITHM

[75] Inventors: Charles J. Cotton, Hopatcong; Stuart I. Feldman, Harding Township, Morris County; Walter D. Sincoskie, Union Township, Union County, all of N.J.

[73] Assignee: Bell Communications Research, Inc., Livingston, N.J.

[21] Appl. No.: 948,115

[22] Filed: Dec. 31, 1986

[51] Int. Cl.$^4$ .............................. H04J 3/24; H04J 3/26
[52] U.S. Cl. ......................................... 370/60; 370/62; 340/825.02
[58] Field of Search ....................... 370/60, 94, 62, 54, 370/88; 340/825.02, 825.07, 825.52

[56] References Cited

U.S. PATENT DOCUMENTS

| | | | |
|---|---|---|---|
| 4,597,078 | 6/1986 | Kempf | 370/94 |
| 4,627,052 | 12/1986 | Hoare et al. | 370/88 |
| 4,651,318 | 3/1987 | Luderer | 370/60 |

FOREIGN PATENT DOCUMENTS 0177759 9/1985 Japan .................................. 370/60

Primary Examiner—Douglas W. Olms
Assistant Examiner—Melvin Marcelo
Attorney, Agent, or Firm—James W. Falk

[57] ABSTRACT

A method for routing data packets correctly and efficiently among a plurality of hosts in a multicast is disclosed. The hosts are connected to a packet switching network comprising a plurality of packet switches interconnected by trunks. A memory associated with the route controller in each switch maintains a table whose entries are tuples of the form < address, trunk identification number, time>. In the case of multicast routing, the address is a multicast address. The trunk identification number is a number which uniquely identifies each of the trunks connected to the switch. Time is a timing parameter which is initially set to a certain predetermined value (designated Maxtime herein) and decremented periodically. When time reaches zero, the associated table entry is cleared. When a host wishes to join a multicast conversation (even if it is the first participant), it simply transmits a packet from itself to the multicast adddress. This packet will be broadcast over the entire spanning tree network. The host then continues to send packets to the multicast address, with a maximum interpacket time interval, smaller than Maxtime, to insure that at least one of the relevant table entries is not cleared.

11 Claims, 3 Drawing Sheets

D: P ➝ DM

MULTICAST ROUTING ALGORITHM

FIELD OF THE INVENTION

The present invention relates to a routing algorithm for efficiently routing data packets among the members of a multicast in a packet switching network.

BACKGROUND OF THE INVENTION

Multicasting is defined as a communication involving one or more senders and receivers. Information transmitted by any participant in the multicast is received by every other participant in the multicast. Users connected to the network who are not participants in a particular multicast do not receive the information transmitted by any of the senders who are participants in the multicast and no network components (e.g. switches and trunks) are used unless actually needed for the multicast. In this sense broadcast (one sender, many receivers) is a special case of multicasting. Possible applications of multicasting include wide-area broadcast (T V. and radio). narrowcast (small area broadcast) and conferencing (small numbers of transmitters and receivers across a wide area).

A telecommunications network may comprise a set of packet switches interconnected by trunks. Illustratively, each switch comprises a switch fabric and is controlled by a route controller, which may be a stored program computing machine or may be a specially dedicated piece of hardware. Such switches are typically used to route data packets from one user in the network to one or more other users. The route controller controls the routing of the data packets through its switch fabric. Thus, the switches serve as cross-connects for a group of trunks. A data packet enters a switch on one trunk and leaves on another trunk.

A packet switch may be centralized or it may be distributed over a large area. An example of a system which forms a distributed packet switch is Ethernet. Thus, the packet switching network may alternately be viewed as a system comprising interconnected subnetworks, wherein each subnetwork may be viewed as a distributed packet switch.

One particular algorithm for routing packets in a packet switching network is disclosed in Kempf U.S. Pat. No. 4,597,078. In the system described in the Kempf patent, packets arrive at packet switches from hosts by way of trunks. Each packet includes a source address, a destination address, and some data. Each switch maintains a table whose entries each include an address and trunk identification number. Upon reception of a packet at a switch, the source address contained in the packet and the identification number of the trunk on which the packet arrived are stored as an entry in the table, unless the table already includes an entry comprising this address and trunk identification number.

Each arriving packet is then routed in one of two ways. If the destination address contained in the packet appears in a table entry as the source address of an earlier packet, the packet is retransmitted on the trunk associated with the remembered source address. If the destination address has never been seen as a source address in a previous packet, the packet is broadcast over all of the trunks connected to the switch, but not over trunk from which it was received.

This algorithm works when the network includes only one possible path between any pair of hosts (i.e. users). This means that the network comprises only a single spanning tree. A more complex network may be handled by decomposing the network into a multiplicity of spanning trees and marking each packet as traveling on a particular spanning tree. The table maintained at each packet switch is expanded to include a spanning tree number for each entry. The multiple spanning tree version of the algorithm is discussed in detail in W. D. Sincoskie U.S. Pat. application Ser. No. 769,555, filed on Aug. 26, 1985, and assigned to the assignee hereof. This patent application is incorporated herein by reference.

However, the algorithms disclosed in the above-identified references are not suitable for routing packets among the participants of a multicast. Accordingly, it is an object of the present invention to provide an algorithm for routing packets among the participants of a multicast.

SUMMARY OF THE INVENTION

The present invention is a routing algorithm which will route packets correctly and efficiently among the hosts or users participating in a multicast in a packet switching network. Illustratively, the network comprises a set of packet switches connected by trunks. Illustratively, each switch comprises a switching fabric controlled by a route controller. Thus, the route controller in the present invention implements the algorithm for the routing of multicast packets. The route controller may be a conventional stored program machine or a dedicated piece of hardware or both.

The switches and trunks are arranged in a single spanning tree geometry. This means the network contains only one path between any pair of users and no loops. More complex networks including loops may be accounted for by decomposing the network into a multiplicity of spanning trees.

Illustratively, packets transversing the network include a source address, a destination address and some data. Multicast addresses are easily distinguishable from other addresses. Illustratively, this can be accomplished by reserving a bit in the address field for this purpose.

A memory associated with the route controller in each switch maintains a table whose entries are tuples of the form <address, trunk identification number, time>. In the case of multicast routing, the address is a multicast address. The trunk identification number is a number which uniquely identifies each of the trunks connected to the switch. Time is a timing parameter which is initially set to a certain predetermined value (designated Maxtime herein) and decremented periodically. When time reaches zero, the associated table entry is cleared. (Alternatively, the timing parameter may be periodically stepped between any initial value and any final value at which point the associated table entry is cleared).

When a packet is received at a packet switch, the following algorithm is executed:

1. Receive a packet on trunk T whose destination address is the multicast address M.

2. Look up M in the table maintained by the switch.

3. If M is not in the table, insert the entry <M, T, Maxtime> into the table, transmit the packet on all trunks except T, (which is the trunk on which the packet arrived) and stop further processing of this packet.

4. If an entry including <M, T> is found in the table, reset the time parameter of that entry to its maximum value, Maxtime: if no such entry is found insert the entry <M, T, Maxtime> into the table.

5. If there are other table entries including the address M, transmit the packet over the trunks contained in these entries and stop further processing of this packet. (However, the packet should not be retransmitted back over the trunk T).

When a host wishes to join a multicast conversation (even if it is the first participant), it simply transmits a packet from itself to the multicast address. This packet will be broadcast over the entire spanning tree network. The host then continues to send packets to the multicast address, with a maximum interpacket time interval, smaller than Maxtime, to insure that at least one of the relevant table entries is not cleared. Other hosts wishing to join the multicast simply transmit a packet to the multicast address when they wish to join.

If a host moves from one location in the network to another, it immediately transmits a packet to the multicast address. This will cause its new location to be added to the multicast. When a host wishes to drop out of a multicast, it simply stops transmitting to the multicast address. After a time interval greater than Maxtime, the network will forget this particular path if it is not otherwise being used (i.e., the relevant table entries will be cleared).

DETAILED DESCRIPTION

Turning to the figures, a packet switch network is illustrated. The network comprises a plurality of packet switches interconnected by trunks. The switches and trunks are arranged to form a spanning tree. The network illustrated in FIG. 1, 2 and 3, comprises eight packet switches, numbered 1 through 8 and seven trunks which will be referred to by their end points. Thus, the trunk connecting switches 1 and 2 will be called T1, 2 or T2, 1. Also, each trunk entering a switch is given a unique address with respect to that switch. For example, T2, 5 is known to switch 2 as trunk #4 and to switch 5 as trunk #1. These numbers are arbitrary, with the proviso that each trunk entering a switch has a different number. The network's initial condition knows nothing about any multi-casting except that the route controller in each packet switch is able to execute the multicast algorithm stated in general form above.

Figure 1:
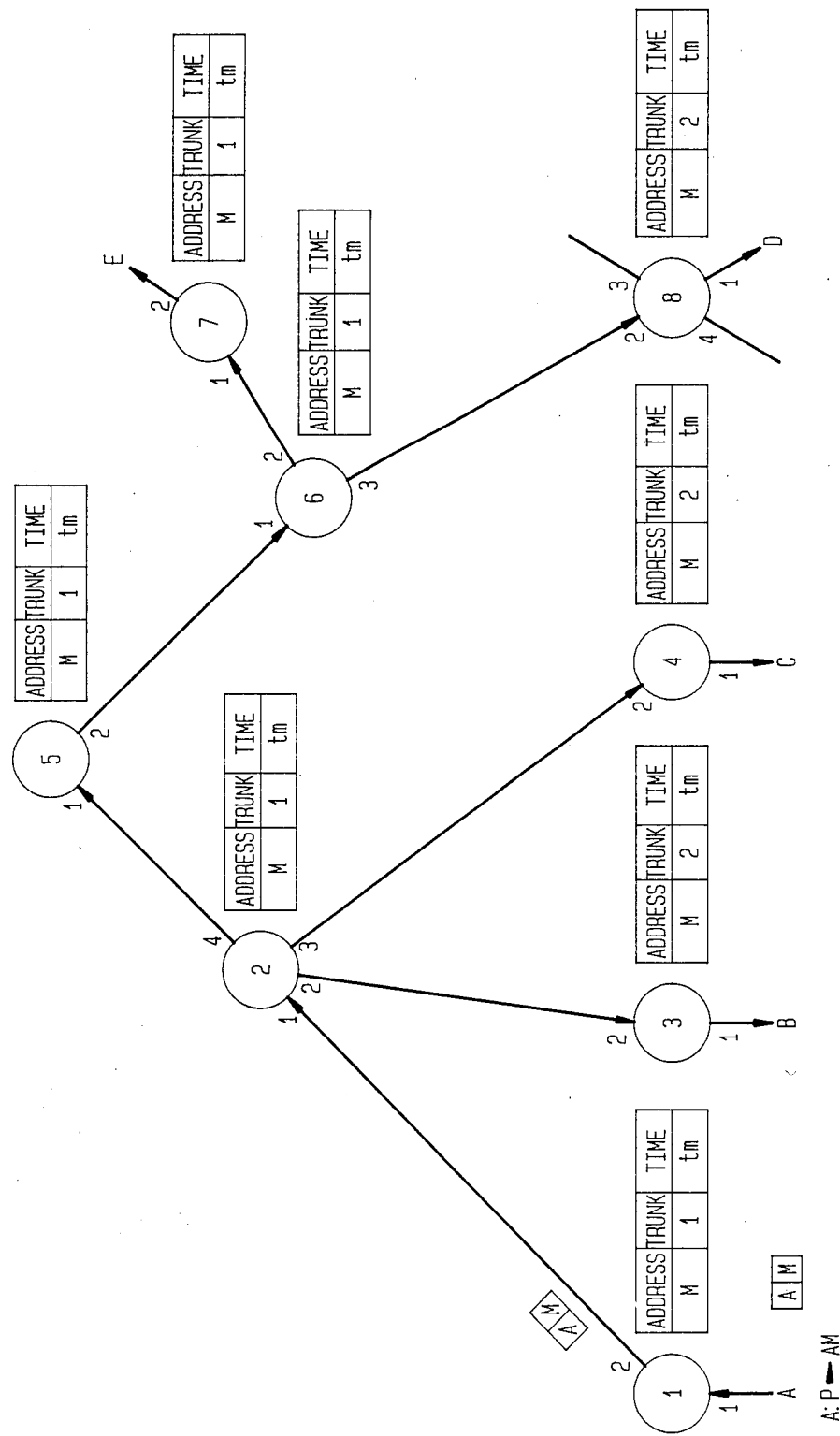
FIG. 1, 2 and 3 schematically illustrate a packet switching network capable of implementing a multicast routing algorithm in accordance with an illustrative embodiment of the invention.

Consider the following example in which the above-identified multicast algorithm is utilized. Hosts A and D wish to setup a multicast conversation using previously agreed upon multicast address M. In FIG. 1, host A transmits a packet carrying source address A and destination address M. The packet enters switch 1 via trunk #1. Switch 1 looks-up the multicast destination address M in its (empty) table and doesn't find it. So, Switch 1 forwards the packet on trunk #2 (the only trunk at switch 1 besides the trunk on which the packet arrived) and enters a tuple <M, 1, $t_m$> in its table. In the table of FIG. 1, the maximum value of the time parameter Maxtime is designated $t_m$. The packet will then pass through all of the switches in the network, leaving the table entries indicated in FIG. 1. For example, the packet enters switch 2 on trunk #1. Switch 2 then looks up the multicast destination address M in its table and does not find this address. The tuple <M, 1, $t_m$> is then added to the table at switch 2 and the packet is transmitted from switch 2 on trunks #2, #3 and #4.

Figure 2:
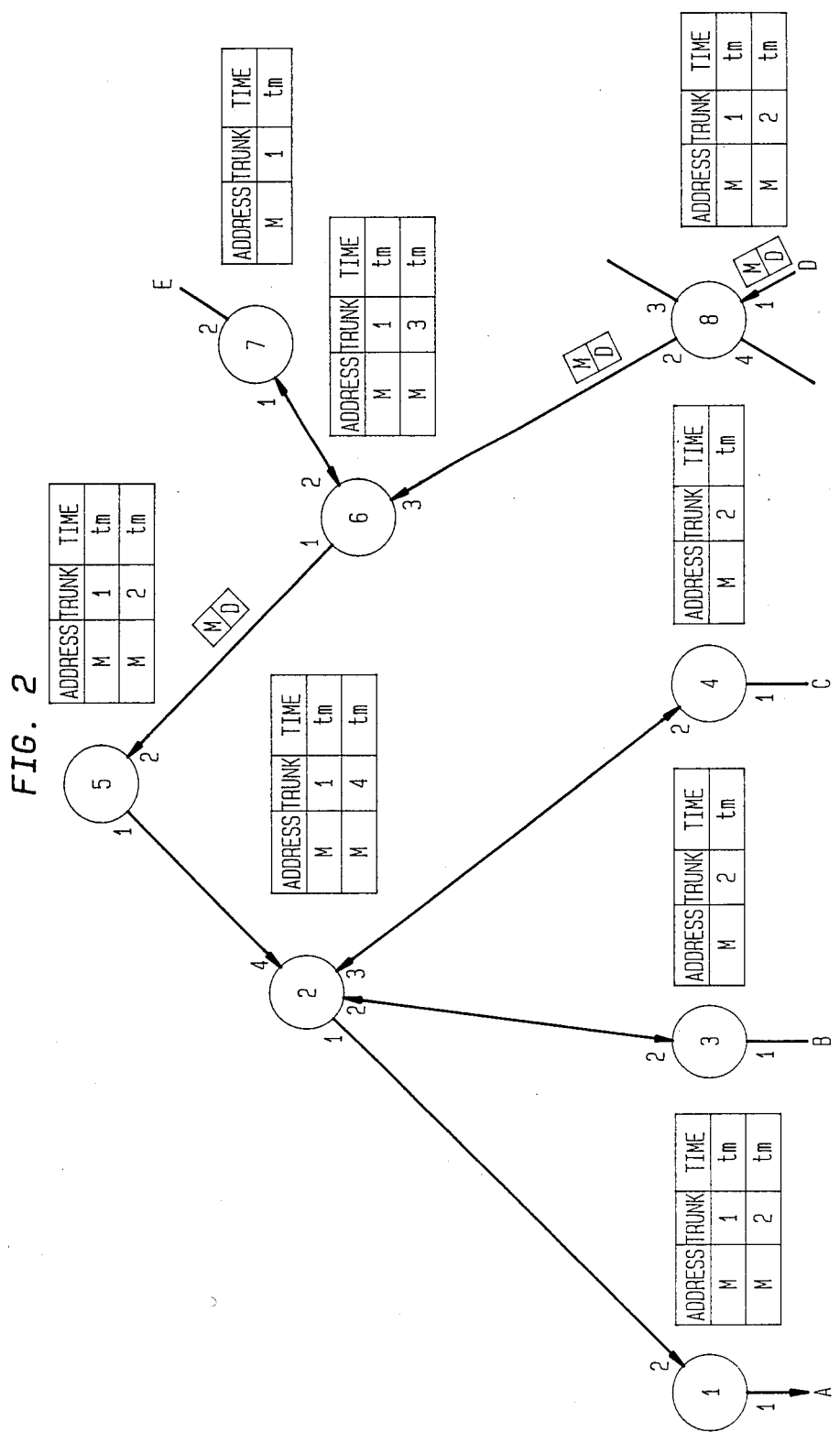

As shown in FIG. 2, host D transmits a packet carrying the source address D and multicast address M. The packet from host D arrives at switch 8 by way of trunk #1. Switch 8 looks up the address M in its table. The address M is found in the table, however the tuple <M, 1> is not in the table. Thus, the tuple <M, 1, $t_m$> is inserted into the table as shown in FIG. 2. The other entry in the table with the address M is <M, 2>. Thus, the packet from host D is routed out over trunk #2 to switch 6. The packet from host D is not routed out over the trunks #3 and #4 of switch 8, nor is it routed back over trunk #1 of switch 8.

The packet from host D arrives by way of trunk #3 at switch 6. The switch 6 looks up the multicast address M in its table. The tuple <M, 3> is not found in the table. This tuple is then inserted into the table along with the time parameter value $t_m$. There is, however, another table entry with the address M, i.e., the entry <M, 1> is found in the table. Thus, the packet from host D is now routed out of switch 6 over trunk #1 to switch 5. Note the packet is not routed out of switch 6 on trunk #2 to switch 7. The packet from host D is not routed to switch 7 because there is no entry <M, 2> in the table at switch node 6. If there was such an entry the packet from host D would be routed to switch node 7. The packet then traverses the network via trunks T5, 2 and T1, 2 arriving at host A. Note also that the packet does not go to switches 3 or 4 since they are not involved in this particular multicast.

At some later time (i.e., at a time greater than time $t_m$ from the initial transmission of the first packet in the multicast from host D) the table entries at switches 3, 4 and 7 will disappear since they have not been reinforced within the period defined by the Maxtime entry. The entries in switches 1, 2, 5, 6, and 8 will remain as they are, since they are reinforced by traffic from hosts A and D within the time interval defined by $t_m$. Such traffic causes the time parameter to be reset to its maximal value $t_m$ so that the relevant table entries are maintained. Thus, the unused entries in the tables maintained by the switches are deleted and needed entries are maintained.

Figure 3:
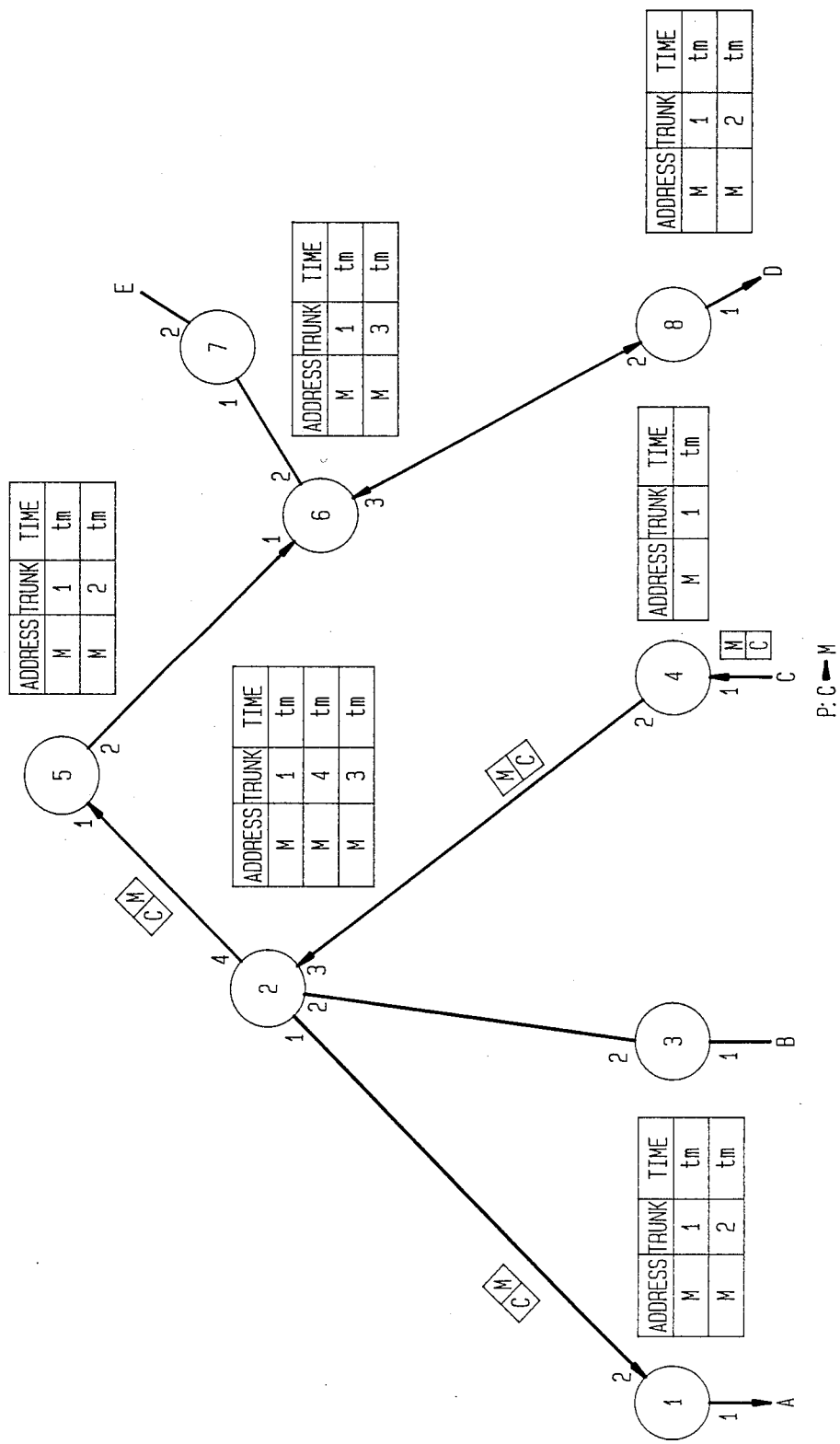

FIG. 3 shows the addition of new host C to the multicast whose address is M. The multicast routing is used so that packets from host C go only to the other participants in the multicast, namely users A and D, and to no other users in the network. As shown in FIG. 3, host C transmits a packet to address M. The packet arrives at switch 4 on trunk #1. Since the previous table entry at switch 4 has been erased, the multicast address M is not found in switch 4. Thus, an entry <M, 1, $t_m$> is inserted in the table at switch 4. The packet from host C is then transmitted out over all trunks connected to switch 4 except trunk #1. This means the packet from host C is transmitted out over trunk #2 to switch 2. The packet from host C arrives at switch 2 on trunk #3. The tuple <M, 3> is not found in the table maintained by switch 2 so that the entry <M, 3, $t_m$> is now inserted. The entries <M, 1> and <M, 4> are found in the table so that the packet from host C is routed out of switch 2 on trunk #1 and trunk #4. By using the multicast algorithm, the packet from host C is only transmitted to hosts A and D and to no other users in the network.

Thus, only the appropriate multicast participants receive the packets from host C.

As indicated above, when a host moves to a new location in the network, it immediately transmits a packet from the new location to the multicast address M. This causes the new location to be added to the multicast. The route to the old location is deleted from the multicast, if no packets are transmitted from there within the time interval $t_m$.

In short, a packet routing algorithm for use in a multicast has been disclosed. The above-described embodiments of the invention are intended to be illustrative only. Numerous alternative embodiments may be devised by those skilled in the art, without departing from the spirit and scope of the following claims.

What is claimed is:

1. A method for routing data packets among the members of a multicast in a packet switching network comprising switches interconnected by trunks, said method comprising the steps of:

maintaining in at least one of said switches a table wherein each entry includes a multicast address and trunk identification number, receiving at said one switch by way of a trunk T, a packet destined to multicast address M, searching said table for entries including the address M, if the table includes no entry containing the address M, inserting an entry including the values M and T into the table, transmitting the packet on all trunks connected to said switch except the trunk T, and stopping further processing of said packet, if the table includes one or more entries with the address M, but no entries with both the values M and T, inserting an entry with the values M and T into the table, and if the table includes one or more entries with the address M, transmitting the packet on the trunks indicated in said entries, but not on the trunk T, and stopping further processing of said packet.

2. The method of claim 1 wherein said switches and trunks are arranged to form a spanning tree.

3. The method of claim 1 wherein each table entry includes a time parameter and said method includes the step of regularly decrementing said time parameter.

4. The method of claim 3 wherein the time parameter in a particular table entry is reset to a maximum value when a packet destined to the multicast address contained in said particular entry is received on the trunk contained in said particular entry.

5. The method of claim 4, wherein a particular table entry is cleared if, within a predetermined time interval, no packet destined to the multicast address contained in said particular entry is received on the trunk contained in said particular entry.

6. The method of claim 1 wherein each table entry includes a time parameter and said method includes the step of varying the time parameter in equal steps between an initial value and a final value.

7. A method for routing data packets among the members of a multicast in a packet switching network comprising switches interconnected by trunks, said method comprising the steps of:

maintaining in at least one switch a table of entries, each entry comprising a multicast address, a trunk identification number, and a time parameter which is regularly varied in equal steps, receiving at said one switch a packet destined to multicast address M from trunk T, looking up entries including said address M in said table, if M is not in said table, inserting into said table an entry including M, T and an initial value of the time parameter, transmitting said packet over all trunks connected to said switch except trunk T, and stopping further processing of said packet, if said table includes an entry containing M but not T, transmitting said packet on the trunk in said entry, and adding an entry including M, T, and the initial value of the time parameter, and if said table includes an entry with M and T resetting said time parameter to its initial value, and stopping all further processing of the packet.

8. The method of claim 7 wherein said initial value of said time parameter is the maximal value of said time parameter and said time parameter is decremented downward from its maximal value.

9. A method for routing packets among a plurality of hosts in a multicast, said hosts being connected to a packet switch network, said method comprising the steps of:

transmitting a packet addressed to a specific multicast address from a first host to a plurality of packet switches in said network interconnected by trunks, transmitting further packets from said first host to said specific multicast address, the time separation between said packets from said first host being less than or equal to a predetermined time interval, transmitting packets to said specific multicast address from one or more other hosts, said packets from said other hosts being routed only to hosts participating in said multicast, and maintaining at least one of said packet switches a table whose entries each comprise a multicast address and a trunk identification number.

10. The method of claim 9 wherein a host is dropped from said multicast by not transmitting a packet to said multicast address within a time that exceeds said predetermined interval.

11. The method of claim 10 wherein if one of said hosts moves from a first location to a second location in said network while engaged in said multicast, subsequent to the movement of said one host, said network ceases transmission of packets to said first location by deleting selected table entries.

* * * * *